United States Patent [19]

Allen

[11] Patent Number: 4,577,302
[45] Date of Patent: Mar. 18, 1986

[54] APPARATUS FOR REPRODUCING MOTION PICTURE FILM PHOTOGRAPHIC SOUND-TRACKS TO CORRECT REPRODUCTION ERRORS AND REDUCE NOISE

[75] Inventor: Ioan R. Allen, Tiburon, Calif.

[73] Assignee: Dolby Laboratories Licensing Corporation, San Francisco, Calif.

[21] Appl. No.: 475,026

[22] Filed: Mar. 14, 1983

[51] Int. Cl.$^4$ .................................................. G11B 7/20
[52] U.S. Cl. ................................. 369/46; 369/92; 369/120; 369/125; 369/44; 352/27
[58] Field of Search .............. 369/46, 92, 107, 113, 369/114, 115, 118, 120, 124, 125, 44, 54, 58, 86; 352/27, 28, 29

[56] References Cited

U.S. PATENT DOCUMENTS

| | | | |
|---|---|---|---|
| 2,205,528 | 6/1940 | Hasbrouck | 369/120 |
| 2,628,288 | 2/1953 | Blaney | 352/27 |
| 3,567,855 | 3/1971 | Hamisch | 369/44 |
| 4,044,207 | 8/1977 | Vlahos | 369/92 |

OTHER PUBLICATIONS

Stereo Review, pp. 38–40, Apr. 1983.

Primary Examiner—Robert L. Richardson
Attorney, Agent, or Firm—Majestic, Gallagher, Parsons & Siebert

[57] ABSTRACT

Apparatus for reproducing motion picture photographic (optical) sound-tracks is disclosed in which significant information regarding track placement, slit illumination, azimuth and impulse noise is derived by dynamically processing and comparing the signals obtained by reading each half of a bilateral sound-track. In a further embodiment a pair of detector elements monitors the septum between two tracks in order to detect lateral film misalignment.

22 Claims, 9 Drawing Figures

APPARATUS FOR REPRODUCING MOTION PICTURE FILM PHOTOGRAPHIC SOUND-TRACKS TO CORRECT REPRODUCTION ERRORS AND REDUCE NOISE

BACKGROUND OF THE INVENTION

1. Field of the Invention

The invention relates generally to motion picture films recorded with photographic (generally referred to as "optical") sound-tracks and to equipment for playing or reproducing them (e.g., motion picture projectors and associated apparatus). More particularly, the invention relates to improvements in the optical sound-track reproduction portions of such equipment. One aspect of the present invention relates to the detection and optional automatic correction of sound-track lateral location errors with respect to the motion picture film projector sound-head. A further aspect of the invention relates to the detection of non-uniform illumination of the slit used to generate the thin beam of light projected onto the film sound-track. A further aspect of the invention relates to the indication of azimuth errors, when the slit is not aligned perpendicular to the direction of film travel. A further aspect of the invention relates to the detection and reduction or suppression of impulse noise (e.g., "ticks" and "pops"), caused by dirt particles, scratches and imperfections in the optical sound-track.

2. BACKGROUND ART

Optical sound-tracks for motion pictures were first demonstrated around the turn of the century, and since the 1930's have been the most common method of applying sound on film. The principle of operation is to have an exciter lamp which illuminates a narrow slit, perpendicular to the direction of film travel. A lens focusses the image of the slit onto the film sound-track, which runs parallel to the direction of film travel, and lies between the picture and the sprocket holes. Behind the film a photocell or solar cell detects the amount of light being passed through the film, and the current or voltage generated by the cell is amplified and sent ultimately to the theatre loudspeaker(s). The transmission of light through the film is varied by either variations in density (an essentially obsolete technique) or by variations of width, where an ideally transparent varying width of sound-track is situated within an ideally opaque surrounding. This latter type of sound-track is known as "variable area".

The first variable area sound-tracks had one fixed edge, with the other edge a distance apart which varied with the required audio modulation. This type of optical sound-track is referred to as "unilateral". The varying clear width causes the required modulation in light transmission received by the cell. It was realized in the late 1930's that errors in light uniformity along the length of the slit could cause distortion components; for example, a fall-off in illumination at that end of the slit that corresponded to peak modulation level could cause significant second-harmonic distortion. In an effort to reduce this effect and other geometric distortion components, the "bilateral" variable area track was introduced. This format has two modulated edges, identical mirror images around a fixed centerline. This techique is immune to constant-slope slit illumination error, but will develop some slight second and third harmonic distortion components under parabolic light error conditions.

A later development, which is now the standard monaural optical sound-track format, is called the "dual-bilateral" (or "double-bilateral" or "duo-bilateral") sound-track. This format has two bilateral elements within the same sound-track area, thus providing further immunity from illumination non-uniformity errors.

In the mid 1970's stereo variable area (SVA) tracks became increasingly popular, in which two independently modulated bilateral sound-tracks are situated side by side in the same area as the normal monaural (mono) variable area track. A two element solar cell is used in this case to provide two independent output signals, one derived from each of the two bilateral sound-tracks.

It will be noted that the mono bilateral sound-track, the mono dual-bilateral sound-track, and the SVA stereo bilateral sound-track all use the basic principle of illumination non-uniformity distoration reduction through signal duplication. In each case, a signal element is mirrored at least once, reducing distortion components; the total light output is then integrated into the photo or solar cell. It can be seen, though, that the integrated total energy received by the cell includes some redundancy. It is the width of the clear area that is the true signal indicator; an integrated signal of total light received by the pick-up cell includes signal components developed by dirt and scratches, and density and illumination dependent distortion components all additive to the signal itself. From time to time, proposals have been made of methods of detecting the variable area track width, as opposed to the integrated light total (for example, U.S. Pat. No. 4,124,784; U.S. Pat. No. 4,355,383; and "The Colortek Optical Stereophonic Sound Film System" by Mosely, et al, *Journal S.M.P.T.E.*, April, 1978, pp. 222–232); most of the proposals intended to take advantage to this art have not been implemented commercially because of the difficulty of projector sound-head modifications, or because of the cost of necessary electronic packages.

The various aspects of the invention described herein comprise simpler mechanisms for taking advantage of the duplicate information provided by the standard bilateral format, whether used in mono bilateral, dual-bilateral or stereo bilateral applications. All the aspects of the invention described utilize a solar cell with more than the normal number of elements, and in most cases require a cell with double the normal number of elements, such that each half of the bilateral sound-track element can be read independently. In this way the intentional redundancy of the mirror image bilateral track structure can provide several useful indicator signals, in addition to the distortion reduction which is currently the only utilized benefit of the bilateral concept.

SHORTCOMINGS OF VARIABLE AREA SOUNDTRACKS

1. Track Misalignment

There are several technical shortcomings with variable area formats, both mono and stereo. One major problem relates to track misalignment. Conventional sound-track width is limited to 0.076", which is the space allocated for the purpose between the picture area and sprocket holes. A width of 0.084" at the nominal sound-track location is illuminated with a thin beam of light by an exciter lamp/optical assembly slit arrangement. The light sensitive cell is located behind the film so that the sound-track area variations modulate the light reaching the pick-up cell. The arrangement thus allows a tolerance of +/−0.004" to take account of any misalignment of the sound-track with respect to the slit and pick-up cell.

In most projectors, the lateral position of the film is adjustable by means of a moveable guide roller; the slit and lens assembly, light source and pick-up cell elements are installed in alignment and kept stationary with respect to each other. The normal procedure for guide roller adjustment is to play a special film known as a "buzz" track, in which two low level square wave signals, one of a low frequency and one high, are located outside the normal sound-track area, such that the inside modulation peaks are 0.084" apart; the recording is accurately centered over the 0.076" correct sound-track position. Thus, if the film sound-track position is correct, the 0.084" wide light beam slit will not illuminate either square wave signal. However, if the sound-track lateral position is improperly located to the left or right, a high frequency or low frequency buzz will be reproduced. The operator can then adjust the guide roller until the buzz disappears.

As discussed above, the two-track stereo variable area format (SVA) has two tracks occupying the same physical location and with the same maximum total width as a mono single or dual-bilateral track, but each carrying different audio information. A 0.010" septum separates the two bilateral tracks. Projection equipment for playing an SVA film employs a similar sound-head arrangement as for a mono film playback, but with a two-element solar cell nominally positioned so as to receive light independently on each cell from the two tracks. Lateral alignment of the film sound-track with respect to the light source/pick-up cells is obviously more critical than when playing a monoaural film.

Following use of a buzz-track test film and guide roller adjustment to align the film sound-track position with respect to the optical assembly, a stereo optical sound-head requires the use of a further test film with tone bursts alternating between the two tracks; this is used to align the twin element solar cell with respect to the film/optical assembly combination. The cell position is adjusted until the reproduced cross-talk from channel to channel is minimum and equal (left-to-right and right-to-left), thus ensuring that the cell is laterally centralized with respect to the sound-track. This combination of procedures is effective provided that the mass produced film being played after alignment with the test films was not made from a misaligned printer, resulting in the sound-track being out of location on the film itself.

In practice, during the physical production of an optical sound-track, sound-track placement on the sound-track negative is normally correct to within 0.001". When prints are made from the negative though, errors as great as 0.004" can be introduced as a result of printer misalignment. Thus, the combined negative and positive errors can lead to a worst case error as great as +/−0.005" on the print. If the projector is properly aligned by use of the described test films, such errors in the print are not a problem with monaural sound-tracks, or with two-track stereo variable area (SVA) films, because of the 0.010" septum between the two SVA tracks. However, if not only the film sound-track, but also the projector cell location is out of alignment, the result may be that peak signals from one track will be scanned by the wrong cell element. The audible results include distortion and, in some cases, image placement drift.

A further problem resulting from alignment errors of this type is a consequence of the solar cell picking up a signal emanating from the outside edge of the opaque sound-track area. Sound-tracks are developed in the laboratory with an added silver deposit, resulting in a better signal-to-noise ratio with conventional infra-red sensitive cells than would result were the sound-tracks to be composed of the original color dye. This redevelopment process involves an applicator wheel which deposits an ill-defined edge at each side of the sound-track. These edges will normally be outside the illuminated slit on the film during playback; if, however, misalignment results in their being scanned, an unpleasant rumble sound results.

Some amelioration of gross misalignment is possible by adjustment of the guide roller until an audible improvement in the reproduced sound is heard. However, if location errors could be accurately identified during the playback of a film, the projectionist could adjust the guide roller for correct alignment or, alternatively, automatic adjustment of the guide roller or solar cell position could be provided. This approach would be particularly useful in playing multiple track optical formats, such as discrete four-channel formats having four or more tracks. Examples of such formats are described in the co-pending U.S. patent application of Ioan R. Allen and Craig C. Todd, entitled Improvements in Stereophonic Motion Picture Photographic Sound-tracks and Apparatus for Recording and Playing Back Photographic Sound-tracks, filed the same day as this application, Ser. No. 475,036 filed Mar. 14, 1983. In such discrete four-channel formats, the septa between the tracks could be made substantially narrower than the 0.010" septum used between the two tracks of an SVA film; in this way the signal-to-noise ratio would not be degraded by unnecessarily wide wasted area allocated to the septa.

2. Illumination Non-uniformity

As previously discussed, another problem in the accurate reproduction of optical sound-tracks is the requirement to maintain uniform intensity of the light beam along the projected slit across the width of the film sound-track. Non-uniform slit illumination can result from the misalignment of the slit, exciter lamp and associated optical assembly, or, more commonly, from ageing or imperfections in the exciter lamp, or even an inadequate power supply causing a hot spot in the center of the lamp filament and a fall-off in illumination at the ends of the slit. The most common illumination error is a falling off of light intensity at the two ends of the light beam, normally with a parabolic distribution; as discussed above, the use of bilateral (in the SVA format) and dual-bilateral (in the mono format) sound-tracks to some extent reduces the distortion components resulting from normal operational errors of this type. However, it would be useful to provide a means for detecting and indicating the presence of such errors in order that severe illumination problems (such as those caused by a severely misaligned lamp, or one blackened through age) could be corrected before the onset of significant audible distortion.

3. Slit Azimuth Errors

Another problem with optical sound-tracks, caused by incorrect initial alignment of the optical barrel assembly, and applicable to both mono and stereo sound-tracks, is incorrect azimuth of the slit, where the slit is not aligned perpendicular to the direction of film travel. Playback of a single sound-track element (a mono sound-track, or one element of a stereo sound-track) shows a loss of high frequencies in the presence of an azimuth error. The problem is more noticeable with stereo sound-tracks, especially if a matrix encoder has been used to encode more than two independent sound channels onto a two track film, as is the case with an SVA format film. In this case, an azimuth error leads to a spurious left track minus right track (LT−RT) component; the error signal will be greatest with signals of the shortest wavelength or highest frequency, and will more often than not be the sibillant component of a dialog signal intended to be reproduced in the center front loudspeaker behind the screen, and which was recorded with identical phase and amplitude onto the two film tracks. During film playback the (LT−RT) component of an SVA film is separated to derive the surround track information, and, as a result, severe azimuth errors can lead to "spitty" dialog components coming from the surround loudspeakers.

4. Noise Caused by Dirt and Scratches

A further problem in the reproduction of optical sound-tracks is the intermittent impulse noise, (heard as "ticks" and "pops") caused by dirt particles temporarily adhering to the clear sound-track area, or permanent imperfections resulting from scratches on the print or clear spots on the print opaque areas resulting from any dirt on the sound-track negative. Although various impulse noise suppression techniques are known, such devices tend to have undesirable side effects that limit their usefulness in many environments, or are excessively expensive for general purpose use. The problem of impulse noise on optical sound-tracks is further exacerbated by a reduction in width of the sound-track elements, such as in the existing SVA format, and to an even greater extent with any new format with even narrower tracks, where the noise producing anomalies have a size distribution which will be a greater percentage of each track width.

SUMMARY OF THE INVENTION

The invention is based on the observation that significant information regarding track placement, slit illumination, azimuth and impulse noise can be derived by dynamically processing and comparing the signals obtained by independently reading multiple element solar cells and in particular by independently reading each half of a bilateral sound-track.

It is apparent that if a sound-track is perfectly aligned with respect to the playback slit and playback cell, and if the azimuth of the slit is exactly perpendicular to the direction of film movement, and if the light is perfectly uniform along the length of the slit, and if there are no dirt particles or scratches adhering to the sound-track, and then if two separate cells read the light modulated by each half of the bilateral track element, then the two currents generated by each half of the cell pair will be equal, i.e., $$I_A = I_B.$$

The required total audio signal can be derived by adding the two cell outputs, i.e., $$A = I_A + I_B.$$

Further, in this ideal playback situation, the difference between the two cell outputs should be zero, i.e., $$D = I_A - I_B = 0.$$

In practice, of course, this condition is never reached, and with normal playback of sound-tracks, $$D \neq 0$$

and comparison of the cell output signals can show which of the various error conditions described above is present. The following table shows some of the detectable error conditions:

TABLE

| CONDITION | PROBABLE CAUSE |
|---|---|
| $I_A$-$I_B$ has a consistent polarity at DC or very low frequencies when the modulation level is greater than about 50%. | Film misaligned with respect to cell or illumination error. |
| $I_A \cong I_B$ when modulation level is greater than about 80% and $I_A \neq I_B$ (e.g., substantially unequal) when modulation level less than about 30%. | Illumination essentially correct, film misaligned with respect to cell. |
| $I_A$-$I_B$ represents a facsmile of the audio with an increasing level proportional to frequency. | Slit azimuth error. |
| $I_A$-$I_B$ has short term transient spikes with different polarities. | Dirt or scratches on one A or B element only. |

Thus significant error information is derivable from a single bilateral sound-track element. If the film sound-track has multiple bilateral elements and two or more elements are monitored, further confirmation as to alignment, azimuth and impulse noise is provided and in addition error information as to parabolic illumination error can be derived.

If a multiple element sound-track is now considered, for example, either a dual-bilateral variable area mono track, or an SVA stereo two-track bilateral film, four cell elements can be used to provide four independent current outputs, $I_A$, $I_B$, $I_C$ and $I_D$ ($I_A$ and $I_B$ reading one bilateral track element; $I_C$ and $I_D$, the other). Extending the discussion above, with a perfect sound-track:

$$I_A = I_B \text{ and } I_C = I_D.$$

A comparison of the two difference signals can be used to provide information as to parabolic illumination error. For example, by comparing ($I_A - I_B$) with ($I_C - I_D$) when the audio level on the two bilateral track elements is within about 2 dB and the modulation level is greater than about 50%, examining the DC or low frequency component yields an indication of parabolic illumination error when ($I_A - I_B$) is negative and ($I_C - I_D$) is positive.

In accordance with the above description, it can be seen that different analyses of twin bilateral track cell outputs can provide the following error indications:
(a) Sound-track/cell misalignment and direction
(b) Illumination error indication
(c) Azimuth error indication
(d) Dirt and scratch indication.

The audio output for each film bilateral element is always derived from the sum of the currents of each cell pair, i.e., (A+B), etc. The error indication and control signals are derived from a comparison of the cell pair signals, such as the difference signal, (A−B), etc. In the case of multiple element formats, two track SVA prints, mono dual-bilateral prints and optical formats with more than two tracks on the film, analyses of combinations of twin cell elements provide further indication and control signals.

Although they will be described in connection with 35-mm motion picture films, aspects of the present invention are applicable to other film sizes.

DESCRIPTION OF THE PREFERRED EMBODIMENTS

Figures 1, 8:
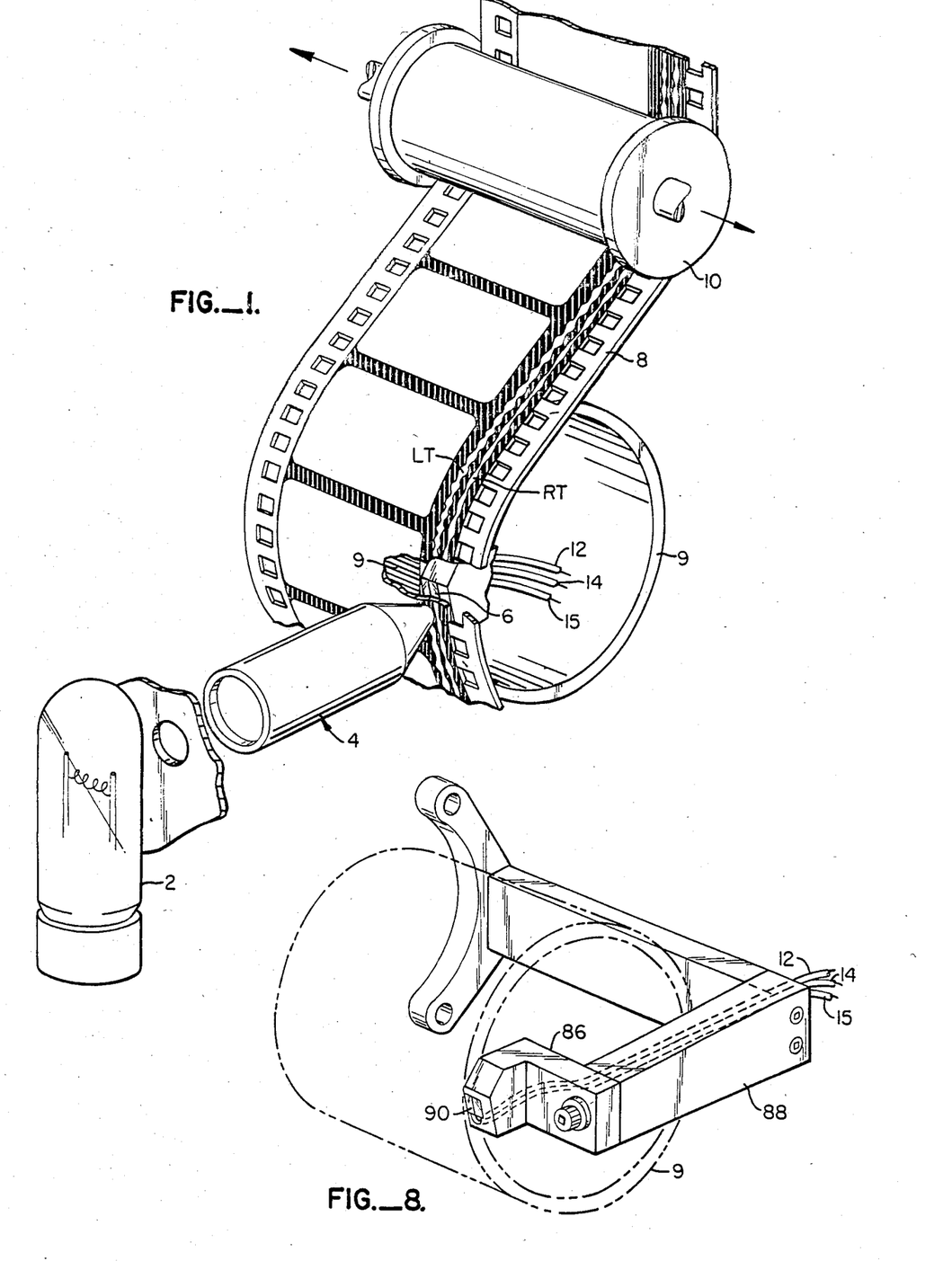
FIG. 1 is a perspective view of a conventional motion picture projector sound-head assembly.
FIG. 8 is a perspective view showing the use of the processed film lateral location error signal to control the solar cell position.

Referring now to FIG. 1, a typical sound-head assembly is shown for use in a motion picture projector playing films with mono or stereo optical sound-tracks (an SVA stereo sound-track is shown). An exciter lamp 2 provides a light source that is focussed onto the film sound-track by a lens and slit assembly 4. This projected beam of light has a width in the order of 0.084" and a height in the order of 0.00125". For the playback of an SVA stereo optical sound-track, a twin element solar cell 6 is located close to the rear of the film 8, and receives the light transmitted through the film sound-track by the projected image of the slit. A rotating sound drum 9 positions the film between the light source/slit and solar cell. An adjustable guide roller 10 provides for precise lateral positioning of the film such that the film sound-track elements LT and RT can be properly aligned laterally with respect to the exciter lamp, slit lens assembly and solar cell. Guide roller 10 is a conventional part of nearly all professional motion picture projectors. The elements 2, 4 and 6 are aligned such that the respective portions of solar cell 6 receive substantially only the light modulated by the respective left and right tracks (LT and RT) when the film is correctly positioned. Current outputs representing the LT and RT signals are thus present on the respective electrical leads 12 and 14 attached to the solar cell pair (lead 15 is a ground lead). Other arrangements for sound-heads are well known in the literature. See, for example, the *Audio Cyclopedia*, by Howard M. Tremaine, Second Edition, 1975, Howard W. Sams & Co., Inc., Indianapolis.

Figure 2:
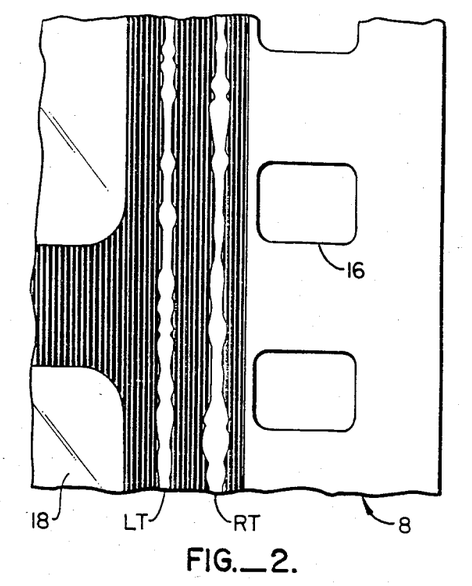
FIG. 2 is a representation of a segment of a conventional 35-mm motion picture film having an SVA sound-track.

In FIG. 2 an enlarged view of a segment of a typical 35-mm film 8 with an SVA sound-track is shown. The sound-track is located between the sprocket holes 16 and the picture frames 18. The audio carried by the left track LT and the right track RT is an exaggerated example to show that each bilateral sound-track is independently modulated. A center front signal is recorded with identical amplitude and phase on the two sound-tracks; as a large portion of most film sound-tracks represents dialog intended to be reproduced from a center front loudspeaker behind the projection screen, it will be realized that for much of the time the two tracks will appear identical, and the extreme difference between the two tracks shown in the figure will only be seen occasionally in a normal motion picture sound-track. With the SVA format, each bilateral variable area track occupies a maximum width of 0.033", and a 0.010" septum separates the two tracks.

Conventional practice with a sound-head intended only to play monaural optical sound-tracks is to use a single element solar cell with a width somewhat in excess of the illuminated 0.084"; projector sound-heads for the playback of four-channel, two-track, SVA films utilize a twin element solar cell, with the two elements separated by a minimal boundary, typically less than 0.001". One pick-up element is positioned to read each track (LT and RT).

Figure 3:
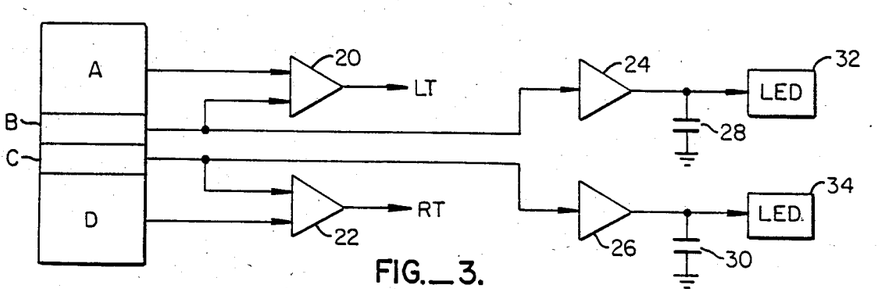
FIG. 3 is a block diagram of an embodiment of the invention showing a simple technique for indication of sound-track location errors.

FIG. 3 shows a simple embodiment of the invention for indicating sound-track location errors, particularly applicable for the playback of SVA optical sound-tracks, or discrete sound-track formats with unilateral edges adjacent to a central septum. An example of the latter type format is described in the said copending U.S. patent application of Ioan R. Allen and Craig C. Todd. In FIG. 3, the solar cell has four juxtaposed elements instead of the normal two for SVA playback. Overall the four elements (ABCD) have the same dimensions as a conventional split cell for use in reading SVA sound-tracks, however the right and left halves each comprise two cell elements: the larger element in each half (A and D) exclude an area congruent with the septum region while the additional cell pairs (B and C) are congruent with 0.010" septum. Elements A and B are additively combined in amplifier 20 to create a conventional LT output, and elements C and D added in amplifier 22 to create the RT signal. Elements B and C are each independently amplified by amplifiers 24 and 26 to create error indication signals. Capacitors 28 and 30 provide a hold condition, and the final outputs are sent to two LED's 32 and 34. It will be realized that the 0.010" septum on an SVA film means that with a perfectly aligned system, neither LED will ever light. With a misaligned system, though, a peak level signal on either track will light the relevant LED, thus alerting the projector operator to the error, which can then be corrected with guide roller adjustment. While this simple system would be perfectly effective for sound-track location error indication, it does not address the other typical operational problems discussed above, which can be alleviated through applications of the embodiments of the invention described below.

Figure 4:
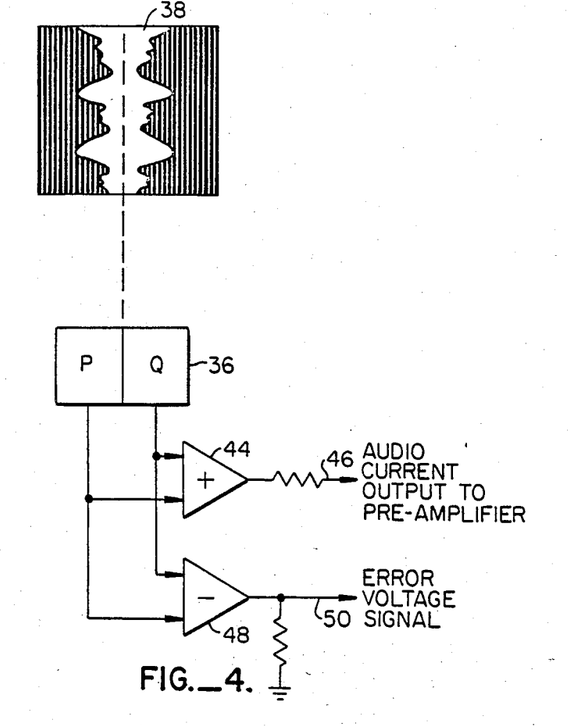
FIG. 4 is a simplified block diagram of a basic embodiment of the invention showing the use of a solar cell pair to read a single bilateral sound-track.

FIG. 4 illustrates conceptually the observation on which the present invention is based. A solar cell pair 36 (a conventional solar cell, split into two substantially equal parts), has its septum aligned with the centerline of a bilateral sound-track element 38 in a sound-head arrangement such as is shown in FIG. 1. The current outputs an electrical leads 40 and 42 from the respective P and Q portions of solar cell 36 are additively combined in amplifier 44 to provide a conventional audio output from the bilateral track. Output 46 is sent to a conventional pre-amplifier. Amplifier 32 has been shown configured to provide a current output as would normally be received by the pre-amplifier; it will be realized that the amplifier could equally well be configured to generate a voltage output. Non-audio error information is available by comparing the signals from the P and Q portions of the solar cell. For, example, the current outputs on leads 40 and 42 are also sent to amplifier 48, where they are subtractively combined to provide an error voltage signal which will be proportional to the difference in light received by the two solar cell elements. As discussed previously, with a perfect sound-track and a perfectly aligned optical assembly, the signal on line 50, a function of ($I_P - I_Q$), will be zero.

Instead of subtractively combining the signals, other comparison techniques can be used. For example, a binary decision can be made depending on the closeness in amplitude to the signals from each half of the bilateral track element. Also, it may be useful to compare the P and Q signals at different sound-track modulation levels. Consider that at high modulation levels any illumination errors will have a greater effect than at low modulation levels because the modulated track width is greater. In addition, any lateral misalignment will be less detectable at high levels than at low levels, as a percentage of the modulated width. Thus as suggested above in Table 1, in order to distinguish track misalignment and illumination error when examinining a single bilateral track element, it may be useful to compare the P and Q signals at a high level, say above about 80% modulation and at a low level, say below about 30% (but above the noise level). If the signals are about equal at the high level but are different at low levels, then correct illumination is likely but there is a strong probability of track misalignment.

Figure 5:
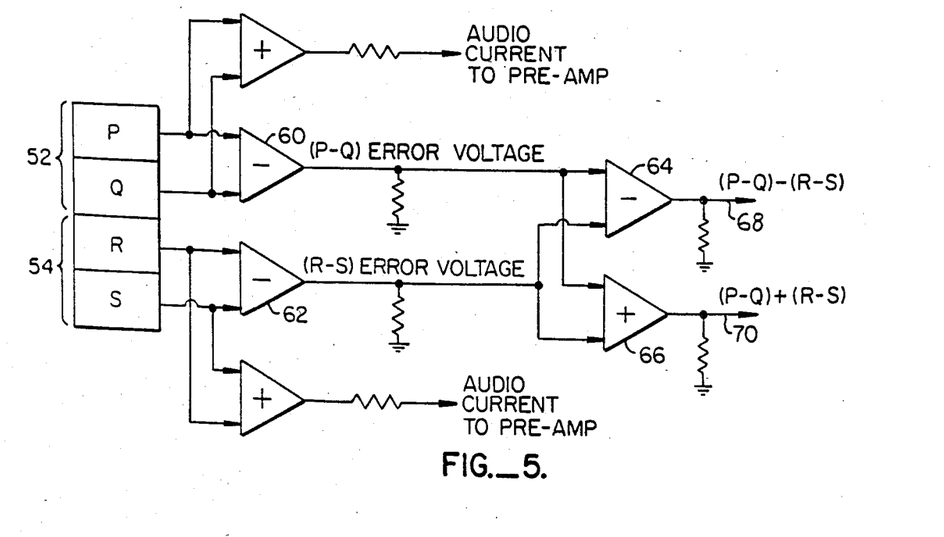
FIG. 5 is a simplified block diagram of an embodiment of the invention showing the use of two solar cell pairs to read each bilateral track of a two-track motion picture film.

Comparison of multiple error signals is necessary to detect illumination errors and is useful in providing more accurate results in confirming other error conditions. FIG. 5 shows a circuit which has two twin element solar cells, with elements P, Q, R and S. Cell elements P and Q of solar cell pair 52 receive the light from one bilateral track element, and cell elements R and S of solar cell pair 54 receive the light from another bilateral element. In the same way as described in the previous figure, amplifiers 56 and 58 provide currents proportional to the audio modulation signals, and are sent to suitable conventional audio pre-amplifiers. Amplifiers 60 and 62 generate voltage signals proportional to the error signals generated from each bilateral pair (e.g., the difference signals). Further amplifiers 64 and 66 create combinations of error signals representing (P−Q)+(R−S) and (P−Q)−(R−S) (where P, Q, etc. are the voltage functions derived from the P, Q, etc. solar cells). As described above, the output signals from these two amplifiers, 68 and 70, will provide error signals caused by, respectively, film lateral position errors, parabolic illumination errors, azimuth errors and impulse noise. It will be apparent that these principles are also applicable to reproducing films having more than two bilateral sound-track elements.

Figure 6:
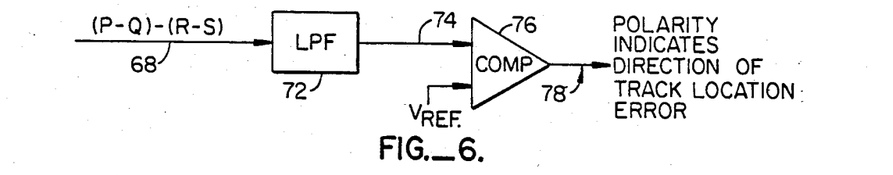
FIG. 6 is a block diagram of signal processing useful with the signals derived in the embodiment of FIG. 5.

A more accurate determination of the above mentioned error conditions can be made after some signal conditioning. In particular, FIG. 6 shows the output error signal 68 passed through an optional low-pass filter 72. The filtered signal (74) is compared with a reference voltage in comparator 76. The comparator output signal (78) has a polarity which will indicate the direction of the track location error. For example, depending upon the polarity convention used, a positive signal could indicate the sound-track being out of location to the left of the solar cell, and a negative signal would then indicate a displacement to the right.

Figure 7:
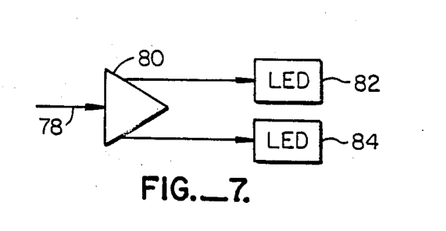
FIG. 7 is a block diagram showing the use of the processed film lateral location error signal to provide visible indication of error.

FIG. 7 shows how the error signal 78 can usefully be applied in practice. With no modifications to the projector sound-head, the error signal can be sent to an amplifier 80 which will switch on one of two alternative LED's (82, 84). Below a certain threshold, neither light will be triggered; above this pre-determined threshold one of the LED's would be illuminated; the projectionist would then be alerted to the fact that there was a location error, and could adjust the guide roller position (adjusting the lateral relationship of the film sound-track and the solar cell) until neither light was illuminated. Alternatively, electromechanical means, such as a servo motor arrangement can be used to adjust the guide roller position (See FIG. 9).

A more sophisticated utilization of the error signal is predicated upon the fact that few sound-track location errors exceed 0.004". Errors of this magnitude or smaller can be corrected by movement of the solar cell; it is only with errors in excess of 0.004" that movement of the guide roller, and consequently the film and sound-track itself, become mandatory. With these normal operational sound-track location errors of a magnitude less than 0.004", (typically caused by laboratory printer misalignment, or inaccurate reel splicing of the release print) the varying quasi-DC error signal can be used to correct directly the relative position of the solar cell and the film sound-track. Various mechanisms are possible, including a servo motor adjusting the the solar cell mounting bracket or as in FIG. 8 the error signal can be used to control a piezo-electric crystal 86 which is mounted on the solar cell bracket 88, and which supports the solar cell 90. A maximum excursion of about +/−0.005" is possible from suitable devices, and the Figure shows accordingly how the cell position can be adjusted dynamically to correct the effective sound-track/solar cell relative position; a voltage applied to the crystal (not shown) will effectively adjust the solar cell position until the error signal is zero. Suitable time constants are applied to feedback control circuitry (not shown) such that there is sufficient damping to avoid unstable and excessive solar cell movement. A similar technique to position a magnetic record/reproduce head is disclosed in U.S. Pat. No. 3,526,726. A lamp can be provided to indicate errors greater than the adjustment range of the piezo-electric crystal to alert the operator to adjust the guide roller.

Figure 9:
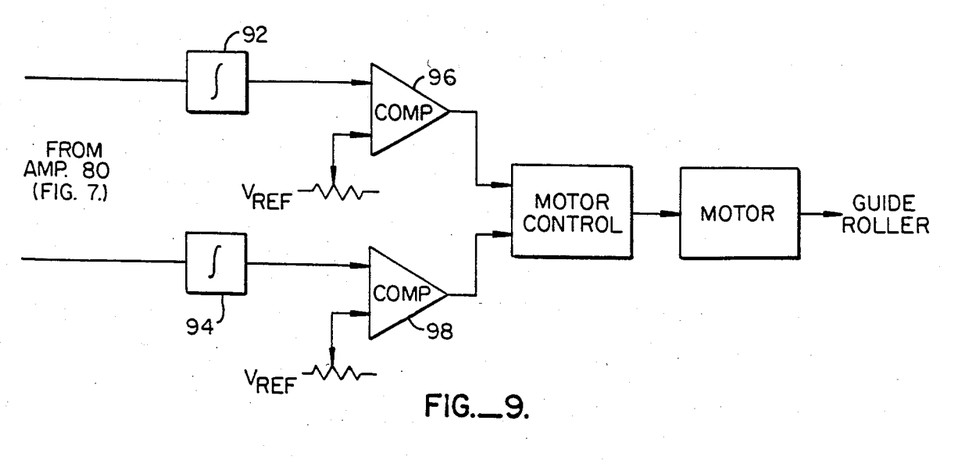
FIG. 9 is a block diagram showing a further use of the processed film lateral location error signal to control the film guide roller.

Errors too large to be compensated by small adjustments of the solar cell assembly can be corrected by a servo motor arrangement controlling the guide roller as shown in FIG. 9. The track location error signals indicating left or right track displacement are integrated in blocks 92 and 94, and applied to comparators 96 and 98, respectively. The comparators have an adjustable reference voltage applied at their other inputs to provide a threshold level for each channel (which can be chosen to allow the arrangement of FIG. 8 to correct small errors). Integrated error signals larger than the set thresholds are applied to a motor control unit 100 that drives a motor 102 in the proper direction to reduce the sound-track misalignment. Suitable time constants are applied to the feedback control circuitry such that there is sufficient damping to avoid unstable and excessive guide roller movement.

Illumination errors can be displayed by applying signal conditioning to the error signal 70 [e.g., (P−Q)−(R−S)] in FIG. 5. The signal is applied to a full wave rectifier to ensure a consistent polarity of the error signal, and a threshold discriminator determines the sensitivity of the error indication that can be displayed by an LED. In practical terms, when the rectifier output exceeds a pre-defined limit, an LED will illuminate, alerting the projector operator to the probability of an illumination uniformity error.

Further signal conditioning can be applied to signals available in FIG. 5 to show slit azimuth errors. It will be apparent that comparison of the two halves of any bilateral pair [(P+Q), (R+S)], etc., will show error signals if the slit azimuth is incorrect. Known techniques for phase error detection can be used to generate the error signal. Applying one such technique; the difference or error signal between the two bilateral signal elements (P and Q, or R and S, etc.) are processed by comparators with hysteresis (e.g., an arrangement in the nature of a sample and hold which ignores short term deviations until a consistent opposition condition occurs) which remove low level impulse noise from the error signals; they are then high-pass filtered to remove any audio dependent location or illumination error signals. The filtered output signals are then heavily limited (so as to create square waves) in separate amplifiers. A comparator can then be structured such that any temporal difference exceeding a pre-determined limit will provide an output signal. This can be used to switch on an error lamp, typically an LED, to indicate to the projector operator that the optical assembly has an incorrect azimuth alignment.

Unwanted noise associated with optical sound-tracks comes from several different mechanisms. First, "grain" noise, which is generated either by granular density deviations in the film emulsion, mainly in the clear area of a variable area sound-track, or "boundary" noise caused by "edge fuzziness" on the edge between the trasparent and opaque regions. Both of these noise components will be heard on a new sound-track with no wear, and will not change significantly as the film ages. The next two noise generating mechanisms are both related to wear, and are caused by scratches in the sound-track opaque area causing a momentary reduction in density, or by dirt (dust, lint or hairs) obscuring for a moment part of the sound-track clear area. The final noise generating mechanism is caused by momentary processing discontinuities in the laboratory, where a "blob" of undeveloped film in the clear area can be caused by dirt on the print during exposure, or a clear spot in the otherwise opaque area caused by a particle of dirt on the sound-track negative. With the exception of grain noise, all the other effects described above have an impulsive content, and can be heard as ticks and pops as a film plays.

While it is possible to conceive of impulse noise on an optical sound-track which will be equal on both elements of a bilateral track (a bad splice exactly perpendicular to the direction of film travel, for example), it will be apparent that most impulse noise will be generated within one or other of the half tracks. Thus, the signal available from a comparison of the two halves of a bilateral track, as in the embodiments of FIGS. 4 and 5, is also useful in detecting impulse noise.

In a simple embodiment, the subtractive combination of the signals from the cell pair halves P and Q of FIG. 4 and be high pass filtered and differentiated or, in the embodiment of FIG. 5, the error signal 68 [e.g., (P−Q)+(R−S)] is so processed. The cutoff frequency of the high pass filter is not critical. It is sufficient that the filter has a corner frequency sufficiently high with a roll off such that any residual audio components are discriminated out. The resulting signal is a positive or negative going spike whenever an impulse is encountered. This signal can be usefully applied in a number of ways; it will be realized that a positive polarity will mean that the cell element P is receiving more light than element Q, and vice-versa. Consequently a positive polarity of an impulse suggests either a scratch in the P element of the bilateral track, or dirt in the clear area of the Q element. Conversely, a negative signal suggests a scratch in the Q half-track or dirt on the clear P area.

The signal can be full-wave rectified to provide a signal that is always positive going in response to impulse noise. The signal can then be processed by an expander or other suitable processing such that there is an adjustable threshold below which low level impulse noise will not cause spurious click suppression when the signal is used as a control signal.

Playback-only click suppressors are well known in the art, most commonly being used for the playback of phonograph records; while these devices are of varying benefit, depending on their complexity, they all have one major shortcoming—the inability to discriminate definitively between intentional impulse noise which is part of the recorded material, and impulse noise caused by dirt and scratches. It will be realized that the control signal derived in the manner just described provides such a definitive indicator for optical sound-track playback which can be used in various ways to control the action of click suppressors.

One simple technique according to the present invention in which such an impulse noise indication signal can be used to reduce the annoyance value of such noises is by reducing the high frequency component of the noise transient. Left channel and right channel audio is applied to fixed delay means and to variable high frequency attenuation circuits. The impulse noise indication signal controls the attenuation. The delay is short and is provided so that adjustment of the frequency response of the frequency attenuation circuits can be completed before the noise impulse arrives. A suitable time constant following the noise impulse reduces the risk of the adjustment itself causing a click. With stereophonic optical sound-track systems utilising at least two tracks on the film, it may be necessary to apply the high frequency attenuation to more than one audio channel simultaneously, thus avoiding sudden stereo image shifts at the moment of high frequency attenuation.

The impulse noise indication signal can be used to control more sophisticated circuitry. In a further embodiment, the audio signal is normally passed through a delay line. Upon occurrence of a noise impulse, at the next zero crossing of the delayed audio, which matches a zero crossing of the undelayed audio, the output is switched and taken from before the delay line. By that time the noise pulse is in the delay line. After a sufficient period of time to permit the noise pulse to propagate through the delay line, at the next zero crossing of the undelayed audio with the delayed audio, the output is switched and again taken from the delay line output.

Referring back to the above discussion about the impulse noise indication signal, prior to rectification, it will be recalled that a positive going excursion could indicate dirt in the clear area of one half track, or a scratch in the opaque area of the other half track. A more sophisticated approach to impulse noise suppression is made possible by resolution of this ambiguity. The full-wave rectified signal indicates the presence of an impulse noise on one or other of the half tracks. If at the moment that such a signal is present, the two audio components are compared, there will be more high frequency signal content emanating from the half track with the impulse noise whether this is caused by a scratch in the opaque area, or a dirt particle on the clear area. This identification makes possible a technique in which in the absence of impulse noise the audio is taken from the normal addition of the P and Q cell elements.

When an impulse noise is indicated by the full-wave rectified impulse noise indication signal, the high frequency content of track element P is compared with that from element Q, and for the duration of the impulse noise component, the audio output is taken only from the track element with the least high frequency component. It will be realized that when one half track only is being used for audio that 6 dB of gain will have to be applied to the signal to avoid output level shifts; it will also be realized that there will be a 3 dB decrease in signal-to-noise ratio resulting from grain and boundary noise when only half the usual pick-up cell area is reading the track, but this proves to be of such a short duration as to be virtually inaudible, or at least far less psychoacoustically annoying than the impulse noise would be.

I claim:

1. Apparatus for reproducing motion picture film variable area photographic sound-tracks, wherein the film has at least one bilateral format sound-track in which substantially identical audio information is recorded in mirror-image halves of said at least one bilateral sound-track, comprising
means for reading said at least one bilateral sound-track to generate a first and a second signal, the first signal being generated substantially in response to one half of the bilateral sound-track and the second signal being generated substantially in response to the other half of the bilateral sound-track; and
means for comparing the two signals to provide non-audio information for correcting reproduction errors and reducing noise.

2. Apparatus according to claim 1 wherein the reading means is adjacent to the film and wherein said comparing means provides non-audio information as to the location of the motion picture film relative to said reading means.

3. Apparatus according to claim 2, said reading means including a light source on one side of the film to provide light for illuminating a narrow slit area of said at least one bilateral sound-track, wherein the film is travelling in a direction and wherein the non-audio information provided is with respect to the azimuthal location of the slit relative to the direction of film travel.

4. Apparatus according to claim 2, said reading means being substantially aligned with the film to read said at least one bilateral sound-track, wherein the non-audio information provided is with respect to the lateral location of the motion picture film with respect to the reading means.

5. Apparatus according to claim 4 wherein said means for comparing includes means for subtractively combining said signals.

6. Apparatus according to claim 4, further comprising means for moving said reading means relative to said motion picture film in response to said non-audio information.

7. Apparatus according to claim 6 wherein said reading means includes a light sensitive detector and said means for moving said reading means includes a piezoelectric crystal for moving said detector.

8. Apparatus according to claim 4, further comprising means for moving said motion picture film relative to said reading means in response to said non-audio information.

9. Apparatus according to claim 8 wherein said reading means includes a guide roller for laterally positioning said motion picture film and said means for moving said reading means includes a motor for moving said guide roller.

10. Apparatus according to claim 1 wherein said comparing means provides non-audio information on impulse noise in said at least one bilateral sound-track.

11. Apparatus according to claim 1 wherein the film has at least two bilateral sound-tracks and wherein, for each bilateral sound-track, said reading means generates a pair of a first and a second signal substantially in response to each half of such bilateral sound-track and said comparing means compares each pair of signals to derive non-audio information.

12. Apparatus according to claim 11 wherein said reading means includes
means for illuminating said bilateral sound-track with light, and
means for detecting the light modulated by said bilateral sound-tracks.

13. Apparatus according to claim 12 wherein said comparing means provides non-audio information as to the illumination uniformity of the light applied to said bilateral sound-tracks.

14. Apparatus according to claim 13 wherein said comparing means includes means for subtractively combining each pair of signals to provide the subtractive combination of each pair of signals.

15. Apparatus according to claim 14 wherein said comparing means includes means for subtractively combining the subtractive combination of said pairs of signals.

16. Apparatus according to claim 11, said reading means being substantially aligned with the film to read said at least two bilateral sound-tracks, wherein said comparing means provides non-audio information as to the relative lateral location of the motion picture film relative to said reading means, the comparing means including means for subtractively combining each pair of signals to provide the subtractive combination of each pair of signals.

17. Apparatus according to claim 16, wherein said comparing means includes means for additively combining the subtractive combinations of said pairs of signals.

18. Apparatus according to claim 11 wherein said comparing means provides non-audio information on impulse noise, the comparing means including means for subtractively combining each pair of signals.

19. Apparatus according to claim 11, further comprising means for adding each pair of signals to reproduce sound signals from said at least two bilateral sound-tracks.

20. Apparatus according to claim 1, further comprising means for adding the two signals to reproduce sound signals from said at least one bilateral sound-track.

21. In an apparatus for reproducing motion picture film photographic sound-tracks, wherein the film has at least two closely spaced sound-tracks separated by a septum, an arrangement for detecting the lateral misalignment of the film with respect to the reproducing apparatus, comprising means located on one side of the film adjacent the sound-tracks for illuminating the sound-tracks with a narrow slit of light, and means located on the other side of the film adjacent the sound-tracks for detecting the light modulated by the sound-tracks, said means including a multiple element light detector having a pair of detector elements nominally dimensioned to coincide with said septum, whereby said pair of elements receive substantially no light when the film is properly aligned with the reproducing apparatus.

22. Apparatus according to claim 21 further comprising means receiving signals from said pair of light detector elements for providing a human perceptible indication in response to each respective element, whereby indications of lateral misalignment and direction of lateral misalignment are provided.

* * * * *